United States Patent
Prakash et al.

(10) Patent No.: US 6,434,626 B1
(45) Date of Patent: Aug. 13, 2002

(54) METHOD AND APPARATUS FOR LOW LATENCY NETWORK PERFORMANCE MONITORING

(75) Inventors: Ramkrishna V. Prakash, Houston; William F. Whiteman, Cypress, both of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/229,885

(22) Filed: Jan. 14, 1999

(51) Int. Cl.$^7$ .............................................. G06F 13/00
(52) U.S. Cl. ...................... 709/238; 709/220; 709/224; 709/313
(58) Field of Search ................................ 709/203, 220, 709/221, 223, 224, 227, 238, 313, 321, 250

(56) References Cited

U.S. PATENT DOCUMENTS

| | | | | |
|---|---|---|---|---|
| 5,039,980 A | * | 8/1991 | Aggers et al. | 340/506 |
| 5,909,540 A | * | 6/1999 | Carter et al. | 714/4 |
| 5,960,173 A | * | 9/1999 | Tang et al. | 348/15 |
| 6,105,122 A | * | 8/2000 | Muller et al. | 712/1 |
| 6,164,920 A | * | 12/2000 | Nazarian et al. | 417/4 |

* cited by examiner

Primary Examiner—Viet D. Vu
(74) Attorney, Agent, or Firm—Fletcher, Yoder & Van Someren (57) ABSTRACT

A method and apparatus for reducing latency caused by cumulative point-to-point messaging associated with network performance monitoring in SAN-attached $I_2O$ architectures. In a computer system, a performance monitoring OSM associated with a first node generates status request messages to a first multicast ISM residing on a first governor IOP associated with a first node for requesting the status from all nodes. The first multicast ISM generates status request messages to all node 1 devices and node 1 IOPs and to a second multicast ISM residing on a node 2 governor IOP. The second multicast ISM generates status request messages to all node 2 devices and node 2 IOPs. One or more "unhealthy" device response messages may be sent to the performance monitoring OSM containing the TID of the "unhealthy" device to allow a subsequent point-to-point detailed status request message to be issued. For "healthy" nodes, a response message is issued to an adjacent governor IOP with an "all fine" indication and the TID set to the TID of the governor IOP. If all nodes in the network are "healthy", an "all fine" indication is passed to the performance monitoring OSM with the TID set to the TID of the governor IOP of the performance monitoring node.

18 Claims, 8 Drawing Sheets

METHOD AND APPARATUS FOR LOW LATENCY NETWORK PERFORMANCE MONITORING

FIELD OF THE INVENTION

The present invention is in the field of computer networks. In particular, but not by way of limitation, the present invention relates to a method and apparatus for reducing latency associated with monitoring the performance of nodes organized in a network that allows multicasting. By way of example, the present invention is directed to a System Area Network (SAN) that is compliant with Intelligent Input/Output ($I_2O$) architectures.

BACKGROUND OF THE INVENTION

With the proliferation of high performance computer workstations in virtually every workplace and the increased demand for interconnectivity, computer networks have experienced corresponding growth. Computer networks are a driving force in increasing workplace productivity by allowing resources to be shared efficiently among multiple users and allowing alternate or backup resources to be used when other resources fail or become congested with traffic. Networks further and facilitate the efficient transfer of large amounts of data between network nodes depending on dynamic traffic conditions and node health. As networks become more complex and greater numbers of elements are added and serviced by individual network servers, the factors which impact the efficiency of data transfer therefore increase in number. Moreover, networks of networks are becoming a more common part of the networking environment leading to ever increasing degrees of complexity for individual network servers to manage.

Along with data transfer efficiency, critical network management functions such as performance monitoring may be compromised by increasing demand for bandwidth and a shift to more data-driven computing. Driven by factors including increases in processor speeds, increasing demand for open architecture designs, and I/O bottlenecks created by bus bandwidth limitations and non standard interfaces between device drivers and operating systems, a standardized I/O architecture specification (called Intelligent Input/Output architecture) has been developed by an industry group known as the $I_2O$ Special Interest Group (SIG). The $I_2O$ specification includes, among other things, models for creating device and operating-system-independent network communications.

Because the teachings of the present invention may be better exemplified in relation to the $I_2O$ architecture, a brief overview thereof is provided hereinbelow. Essentially, the $I_2O$ architecture uses a "split driver" model wherein a messaging layer is inserted for dividing a single device driver into two separate modules—an Operating System Service Module (OSM) and a Downloadable Driver Module (DDM). The OSM comprises the portion of the device driver that is specific to the operating system. The OSM interfaces with the operating system of the computer system, which may also be referred to in the art as the "host operating system", and is executed by the host CPU or processor. Typically, a single OSM may be used to service a specific class of peripherals or adapters. For example, one OSM would be used to service all block storage devices, such as hard disk drives and CD-ROM drives. As described, in the split driver model, the DDM provides an interface between the specific device and the OSM. The DDM includes the peripheral-specific portion of the device driver that understands how to interface to the particular peripheral hardware, while providing support for standard calls to the devices of a device class by the operating system by way of the OSM. To execute the DDM, an $I_2O$ Input/Output Processor (IOP) is added to the computer system. A single IOP may be associated with multiple peripherals, each controlled by a particular DDM, and containing its own operating system such as, for example, the $I_2O$ Real-Time Operating System (iRTOS). The DDM directly controls the peripheral, and is executed by the IOP under the management of the iRTOS.

A DDM may typically include a Hardware Device Module (HDM) that directly interfaces with the peripheral and is responsible for general device control and for managing data transfer to and from the device. A DDM may also include an Intermediate Service Module (ISM) which is an additional software interface to the HDM. Thus the ISM may typically form a custom layer between the OSM and HDM that generally resides on the IOP. In the $I_2O$ specification, the ISM is called out to allow for any special purpose processing that is desired which falls outside of standard OSM to DDM messaging.

A system which is compliant with the $I_2O$ specification uses a message passing model in general operation. When the CPU seeks to read or write to an adapter or peripheral in an $I_2O$ system, the host operating system makes what is known as a "request". The OSM translates the request by the host operating system and, in turn, generates a message. The OSM sends the message across the messaging layer to the DDM associated with the peripheral which processes it appropriately and responds according to the contents of the message. If a special purpose ISM is present, the ISM may process the message prior to the message being passed to the DDM. Upon completion of whatever action the received message specifies, the DDM responds to the OSM by sending an appropriate response message through the messaging layer. Actions may include, but are not limited to, performing a read or write operation performing a data transfer, or reporting device status. The response may include an acknowledgment that the action was performed, the status of the action underway, an error message and the like. By executing the DDM and the ISM if included, on the IOP, time-consuming information transfers to and from the peripheral hardware are off-loaded from the CPU of the server to the IOP. By off-loading I/O processing to the IOP, the server CPU is no longer diverted for inordinate amounts of time during an I/O transaction. Moreover, because the IOP is dedicated to processing I/O transactions, data transfers are carried out more efficiently and faster.

In current implementations of the $I_2O$ specifications, once a typical I/O device is configured the I/O device typically receives only a small subset of message types which typically involve relatively simple data move operations. While the $I_2O$ specification guides the compatibility of systems and devices in a diverse product market, it is important to note that systems may be $I_2O$ compatible yet provide features which better accomplish the goals set forth as the motivation behind $I_2O$, that is, greater I/O independence and data transfer capacity and processor unburdening. Moreover, it is possible to achieve the goals of greater independent I/O data transfer capacity in a system which is not strictly $I_2O$ compliant.

Another solution for relieving network bottlenecks and achieving scalability is to provide a clustered network environment wherein a variety of components like servers, disk drives, tape drives, etc., are integrated into a system-wide architecture such as a System Area Network (SAN). SAN architectures, for example, a fabric network, provide a low latency interconnect between servers and devices and can be configured for I$_2$O compliance. SAN architecture is based on message passing between servers and devices. SAN technology employs the server processor to process data transfer requests between network elements and then allow data transfers to occur under control of dedicated hardware thus reducing server processor overhead to a minimum. In a SAN architecture, a network transport layer may be implemented on a dedicated hardware platform, typically an I/O processor (IOP), which allows a processor to be connected to a scalable switching fabric. A SAN server can then be expanded to add data paths which effectively increase the overall bandwidth of the switching fabric by increasing the number of point-to-point datapaths which can be used to carry data between nodes. Thus, large numbers of nodes which may be clients, other servers, or other network devices such as disk towers, and the like may be controlled by a server. Further, to off-load the processing of data transfers from the server processor, peer-to-peer communications may be set up between devices and the transfers may proceed without further server intervention.

In order to properly manage the SAN and set up peer-to-peer transfers between devices, a server must be aware of the status of the devices within its area or cluster by monitoring the status of network devices. Performance monitoring involves sending periodic status request messages to individual devices and then receiving status request response messages from the devices. Then, as requests are made to the server to set up data transfers between, for example, a healthy device and a device known by the server to be unhealthy, an appropriate error message may be issued or alternative action may be taken by the server. As the number of network elements grows however, the need to conduct network performance monitoring increases correspondingly.

Further, the use of more components in a given SAN cluster not only increases the need to monitor the health of individual components that constitute the SAN but also the health of the cluster (e.g., a fabric) itself to ensure optimum performance. For example, link availability and network latency may require monitoring to select the best data path through the network throughput also may affect route selection. Performance monitoring may also be used to determine availability, throughput and job backlog of print queues. Event logging and alarm generations allowing for analysis of network problems may also be performed by a monitoring server. A problem arises however when a SAN server is used as a performance monitoring node. Since a key advantage of SAN technology is the reduction of processing latency involving data transfers by limiting messages originated in the server processor to I/O transaction setups only, performance monitoring using point-to-point messaging to each network element in a large SAN cluster would overload the server both during the issuance of outbound message packets and during the period when responses from devices are received. As can be readily appreciated, such overloads give rise to unacceptable latencies.

In addition, traffic overloads during performance monitoring may be particularly acute for servers in SAN clusters where the number of nodes is large and the number of devices served by each node is large. In a point-to-point messaging scheme, a status request message must be generated for each device in the SAN cluster. In some cases, the number of devices could be in the thousands. As the thousands of status request messages are issued for a single periodic status check of the SAN cluster, the performance monitoring server and the associated SAN fabric quickly become overloaded with a flood of outbound status request message traffic. Status request messages issued concurrently in a point-to-point scheme may arrive at their destinations at virtually the same time. Devices prepare status response messages and issue them correspondingly close in time resulting in a simultaneous flood of inbound message traffic to the monitoring server and the SAN fabric. Since the issuance of the outbound request messages and the inbound response messages occur close in time, the server may be overloaded for an inordinate amount of time. Such an overload on a critical server leads to processing delays for important tasks or may result in missing the processing of, for example, an important real time event.

It would be advantageous, therefore, to devise a method and apparatus for performance monitoring which avoids compromising the low latency afforded by SAN technology. Such a method and apparatus would avoid traffic overloads so described and allow a SAN server to be available for low latency processing at virtually all times.

SUMMARY OF THE INVENTION

The present invention therefore uses a multicast ISM to receive a status request message from a performance monitoring OSM and to issue multicast status request messages for the entire SAN cluster. A first governor IOP at a first node receives a status request message from a performance monitoring OSM at the first node. A first multicast ISM disposed within the first governor IOP generates status request messages for devices and IOPs local to the first node and propagates the status request message for devices and IOPs local to the first node and propagates the status request message to a second governor IOP at a second adjacent node. The second governor IOP receives the status request message from the first governor IOP. A second multicast ISM disposed within the second governor IOP generates status request messages for devices and IOPs local to the second node.

If additional nodes are present, each governor IOP, in addition to generating status request messages for local devices and IOPs, propagates a status request message to an adjacent governor IOP. The additional adjacent governor IOP generates status request messages for devices and IOPs local to its node and further propagates the status request message to the governor IOP of an additional adjacent node, if present, and so on, throughout the SAN because of the multicast nature of the issuance of status request messages. In one aspect, devices associated with nodes near the performance monitoring OSM can begin responding to local governor IOPs as status request messages are still being propagated. Accordingly, outbound and inbound response processing bottlenecks are minimized.

As status request messages are received by devices at a node, a status request response message is generated and sent by each device to the governor IOP for the node. Each governor IOP responds to the adjacent upstream IOP and ultimately the governor IOP for the performance monitoring node reports the SAN status to the performance monitoring OSM in one of two modes: "healthy" and "unhealthy."A "healthy" response from a governor IOP indicates that all devices local to the governor IOP are in their specified, preferably error-free operating condition. An "unhealthy" response indicates that one or more devices are malfunctioning. If the SAN is healthy, the response message includes an "all fine" indication along with the TID of the governor IOP local to the performance monitoring OSM. If one or more devices are ailing, a response message for each unhealthy device, including a TID for such device may be sent to the performance monitoring OSM. In one embodiment of the present invention, the performance monitoring OSM may then establish point-to-point communication with each unhealthy device to request detailed status information. Upon receipt by the ailing device of the detailed status request message, a detailed response from each unhealthy device containing additional information about the device status, may be sent directly to the performance monitoring OSM.

BRIEF DESCRIPTION OF THE DRAWINGS

A more complete understanding of the present invention may be had by reference to the following Detailed Description and appended claims, when taken in conjunction with the accompanying Drawings wherein:

DETAILED DESCRIPTION

While the present invention performs in accordance with the Intelligent Input/Output (I$_2$O) architecture specification, it is not by way of limitation. It should be understood by those skilled in the art that the teachings of the present invention may be practiced with features independent of the I$_2$O specification. In the following description of the present invention, certain aspects of the I$_2$O specification are discussed for the sake of clarity. For instance, the hardware and software independent architecture centered around a split driver model specified in the I$_2$O specification is used and described in connection with the present invention. Similarly, while a System Area Network (SAN) provides an exemplary environment within which the present invention may be practiced, it should further be understood that the teachings disclosed herein may be implemented in any network architecture including, without limitation, the Next Generation Input/Output (NGIO) schemes.

Figure 1:
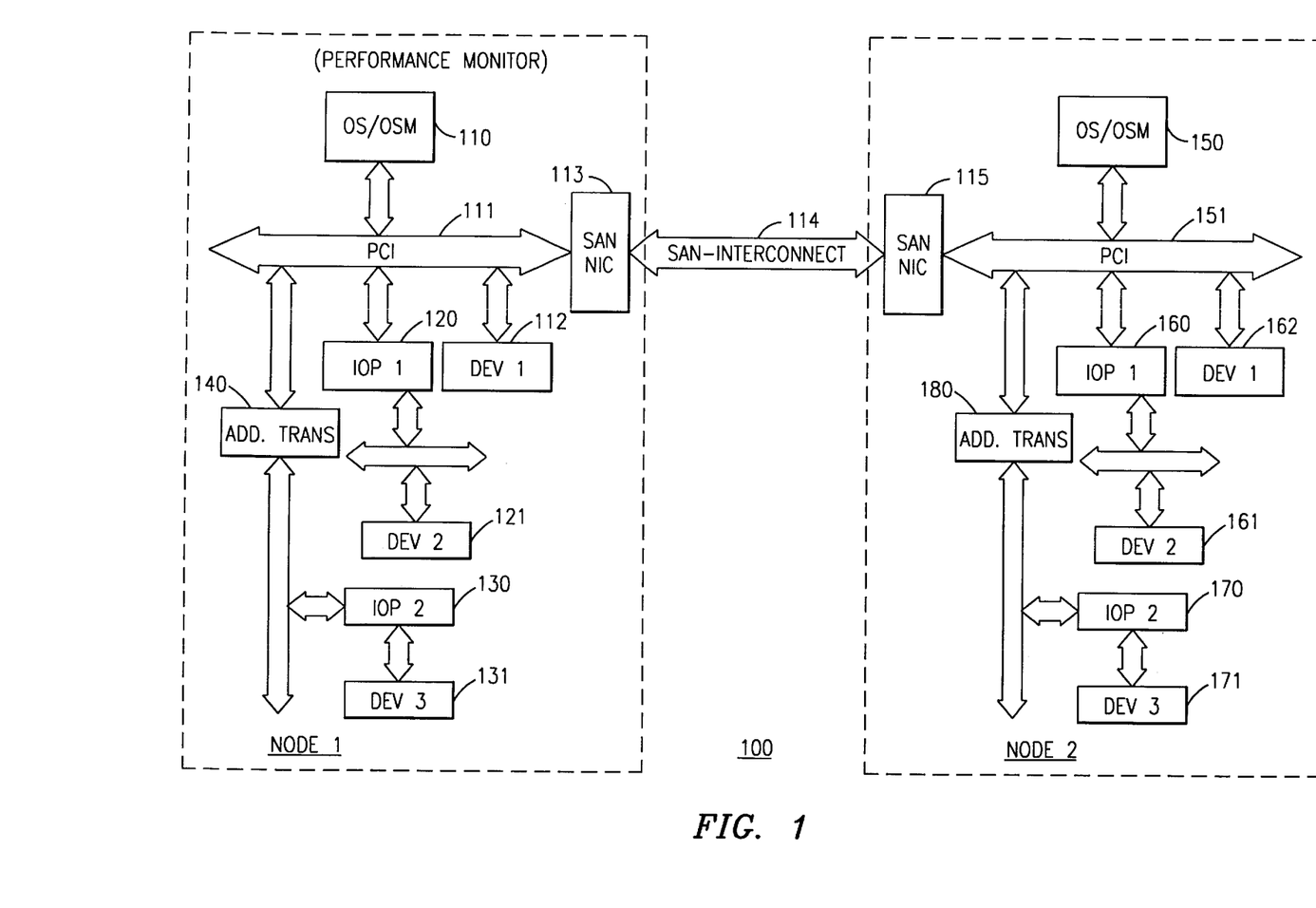
FIG. 1 is a block diagram of a computer system illustrating an exemplary two node SAN using point-to-point performance monitoring.

Referring to FIG. 1 of the drawings, an exemplary embodiment of a SAN cluster 100 is shown. While two exemplary nodes are shown, with OSM 110 acting as the performance monitor at node 1, more nodes may be present. In a clustered environment, groups of devices and networks of devices may be arranged in a plurality of interconnected nodes to form SAN 100. Performance monitoring OSM 110 issues messages to local devices across bus 111 which may be, for example, a Peripheral Component Interconnect (PCI) bus. Messages may further be propagated to other devices through, for example, IOP-1 120 or address translator 140. In addition, messages may be sent across SAN Fabric interconnect 114 through SAN Network Interface Controller (NIC) 113 for node 1 and SAN NIC 115 for node 2. Additional nodes, if present, may be reached through the SAN Fabric Interconnect 114 and associated NICs for the respective additional nodes. In addition to IOP-1 120 and IOP-2 130 shown at node 1, exemplary devices DEV-1 112, DEV-2 121 and DEV-3 131, may be present locally at node 1. At node 2, exemplary devices IOP-1 160, IOP-2 170, DEV-1 152, DEV-2 161, DEV-3 171, and OSM 150 may be present and, if present, must be reached for performance monitoring by, in the illustrated embodiment, node 1 performance monitoring OSM 110. As described hereinabove, however, problems arise in attempting to monitor the health and performance of local and remote node devices in SAN 100 since the number of concurrently issued messages in the point-to-point messaging scheme specified for SAN I$_2$O creates an outbound message traffic overload at node 1 performance monitoring OSM 110.

Implementations of system management and performance monitoring in SAN architectures rely on point-to-point messaging, giving rise to latency issues as the number of devices requiring monitoring and, thus, the number of point-to-point messages which must be generated and issued at one time increases. Latency issues created by, for example, outbound traffic overloads during performance monitoring may further give rise to the need for additional hardware in the performance monitoring SAN server to insure adherence to timing specifications. Additional hardware requirements lead to an overall increase in cost for the performance monitoring SAN server. Latency issues arise because performance monitoring status request messages 200, as will be described hereinbelow in reference to FIG. 2, must be constructed for each device in SAN cluster 100 serviced by node 1 performance monitoring OSM 110. In the exemplary two node SAN 100 cluster as shown in FIG. 1, a total of 4 IOP's and 6 devices are shown although more or fewer devices and IOPs may be associated with each SAN node.

Figure 2:
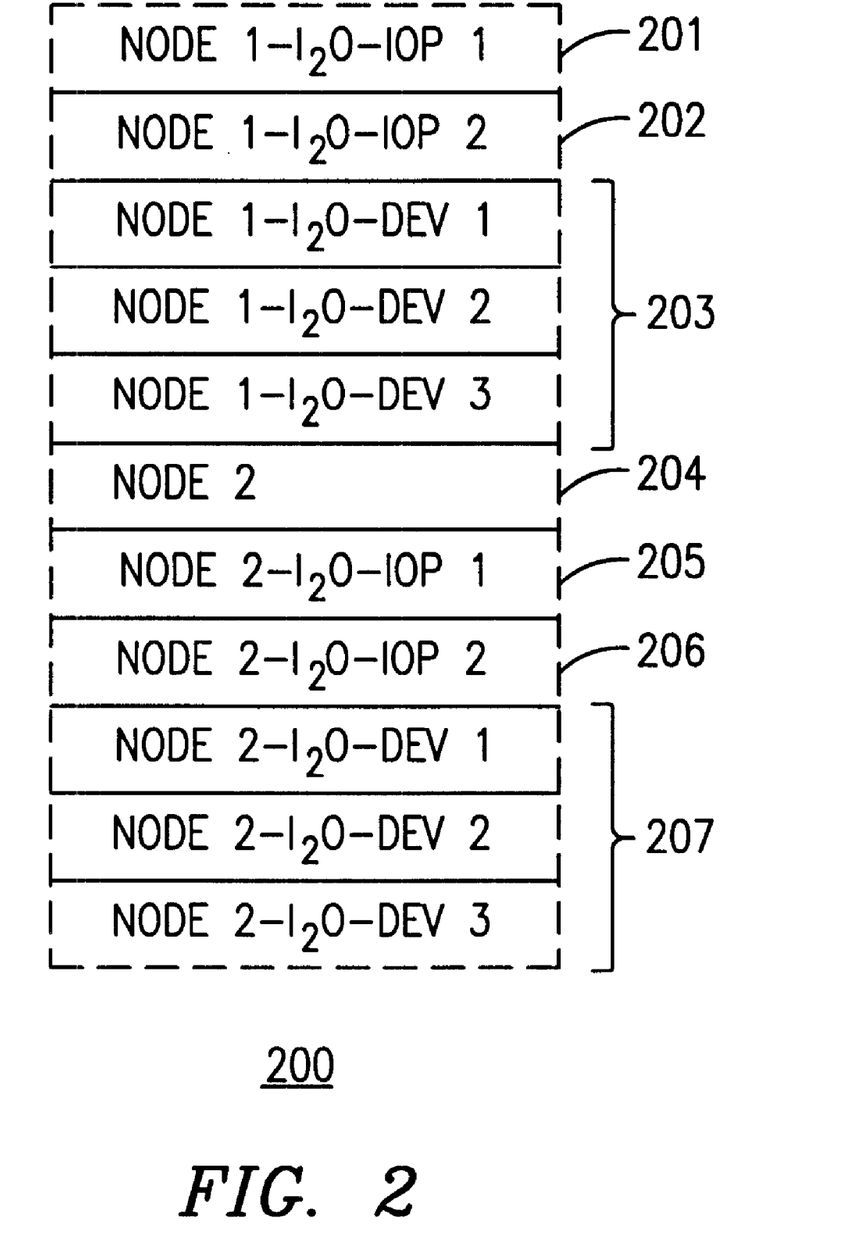
FIG. 2 is diagram illustrating an exemplary message block containing point-to-point status request messages for each device in the SAN.

Referring now to FIG. 2, shown therein is status request message block 200 which is constructed by node 1 OSM 110 to monitor the performance of the exemplary two-node SAN cluster 100. Status request messages 201 through 207 are constructed to account for each IOP and device in the exemplary SAN cluster 100. While the message traffic associated with the exemplary two node scenario illustrated in FIG. 1 may be minimal, it is possible that a much greater number of nodes could exist in a typical SAN cluster. It is further possible that each node could serve many devices and IOP's. Accordingly, it may be readily appreciated that, for a SAN with a large number of nodes, a SAN performance monitoring OSM may need to generate a very large number of status request messages in a performance monitoring message block for any given performance monitoring transaction. Such an extensive outgoing message block would overload the monitoring server and lead to outbound traffic problems and increased latency throughout the SAN fabric. The issuance of such a large number of status request messages would further lead to inbound traffic overloads as devices respond.

Figure 3:
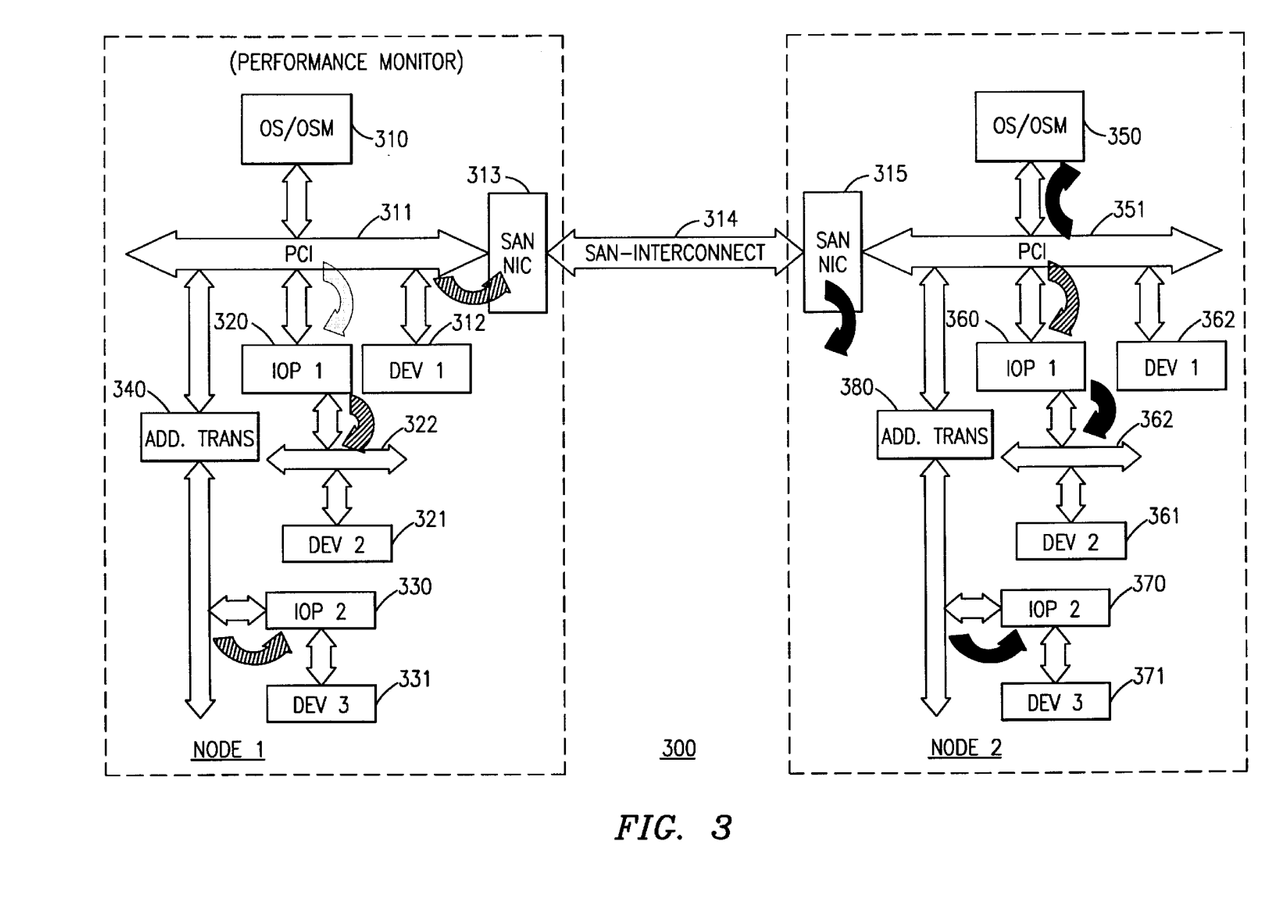
FIG. 3 is a diagram illustrating an exemplary embodiment of a computer system using multicast messaging to achieve performance monitoring in accordance with the teachings of the present invention.

To alleviate the traffic problem caused by the issuance of large performance monitoring message blocks, it is desirable to issue performance monitoring status request messages in a manner which preferably avoids point-to-point messaging. FIG. 3 illustrates exemplary two node SAN 300 using multicast messaging in accordance with the teachings of the present invention. In a presently preferred exemplary embodiment, performance monitoring OSM 310 generates a status request message to local IOP-1 320. In servicing the status request message, IOP-1 320 generates additional status requests for devices which it serves and any other IOP's associated with the node. Since it is desirable to initiate a status request message between performance monitoring OSM 310 and only one IOP, preferably an IOP with direct access to a high speed bus, IOP-1 320 may be assigned as a governor IOP for node 1. Further, a governor IOP may be assigned for each node in SAN 300 for receiving and propagating the status request message. The assignment of IOP-1 320 as governor IOP is somewhat arbitrary and in nodes with many IOPs, it is conceivable that any one of the available IOPs is suitable for assignment as a governor IOP. A governor IOP may be selected automatically by configuration software residing at the performance monitoring server or by manual assignment. Further, the assignment of governor IOP may be automatic or manual on a node per node basis where each node reports the address of the governor IOP to the performance monitoring OSM or some combination of the above methods. It is to be noted that, in the preferred embodiment of the present invention, typically only one IOP acts as governor IOP for each node. It may further be preferable to assign as governor IOP, an IOP which is located on the highest priority, highest speed/capacity bus on the server system. In SAN 300, bus 311 represents the highest priority bus therefore IOP-1 320 is assigned as governor IOP for node 1. Governor IOP-1 320 therefore propagates the status request message across bus 311 to DEV-1 312, IOP-2 330, DEV-2 321, and DEV-3 330. Governor IOP-1 320 may further propagate the status request message across SAN fabric interconnect 314 by way of SAN NIC 313 and SAN MC 315 to node 2 governor IOP-1 360. Since governor IOP-1 320 is the IOP local to performance monitoring OSM 310, inbound status from devices local to governor IOP-1 320 and status propagated from adjacent nodes and/or status reports from ailing devices will be processed and forwarded by governor IOP-1 320 for the entire SAN as described hereinafter. Subsequent point-to-point messaging dialogs may be established between performance monitoring OSM 310 and ailing devices for more detailed information as further described hereinafter.

Thus, to recapitulate, when the OSM 310 of the performance monitor needs to ascertain the health of the SAN 300, the following sequence of events typically occur in the presently preferred exemplary embodiment of the invention. First, the OSM of node 1 posts a status request of its local entities indicated by the light gray curved arrow. Following this, a multicast ISM on the local governor $I_2O$-IOP (IOP-1 320) generates status requests for the local IOPs and devices. Concomitantly, the governor $I_2O$-IOP (IOP-1 320) at Node 1 also posts a status request to the adjacent remote-governor $I_2O$-IOP (IOP-1 360, which resides in Node 2). These second-order status requests issued by the multicast ISM of the governor $I_2O$-IOP at Node 1 are indicated by the dark gray curved arrows shown with a cross-hatch pattern. Subsequently, when the governor $I_2O$-IOP at Node 2 receives a status request of the devices at that node the multicast ISM at Node 2 in turn generates status requests for IOP's, devices and CPU at that node. In addition, it also issues a status request to the next remote governor $I_2O$-IOP along the SAN NIC Fabric. The black curved arrows which indicate these status requests, accordingly preferably follow in time after those indicated by the dark gray arrows. It should, therefore, be appreciated that this multicasting approach to propagate status requests would resolve the resource bottleneck that would occur if the OSM would issue point-to-point status requests from the performance monitor to the various CPUs, devices and IOPs along the different nodes in its SAN environment. In addition, using the multicast status request approach would then cause the responses from the various devices to arrive in sequence, preventing the OSM at Node 1 from a barrage of responses which may also cause the bogging down of the OSM at Node 1.

Figure 4:
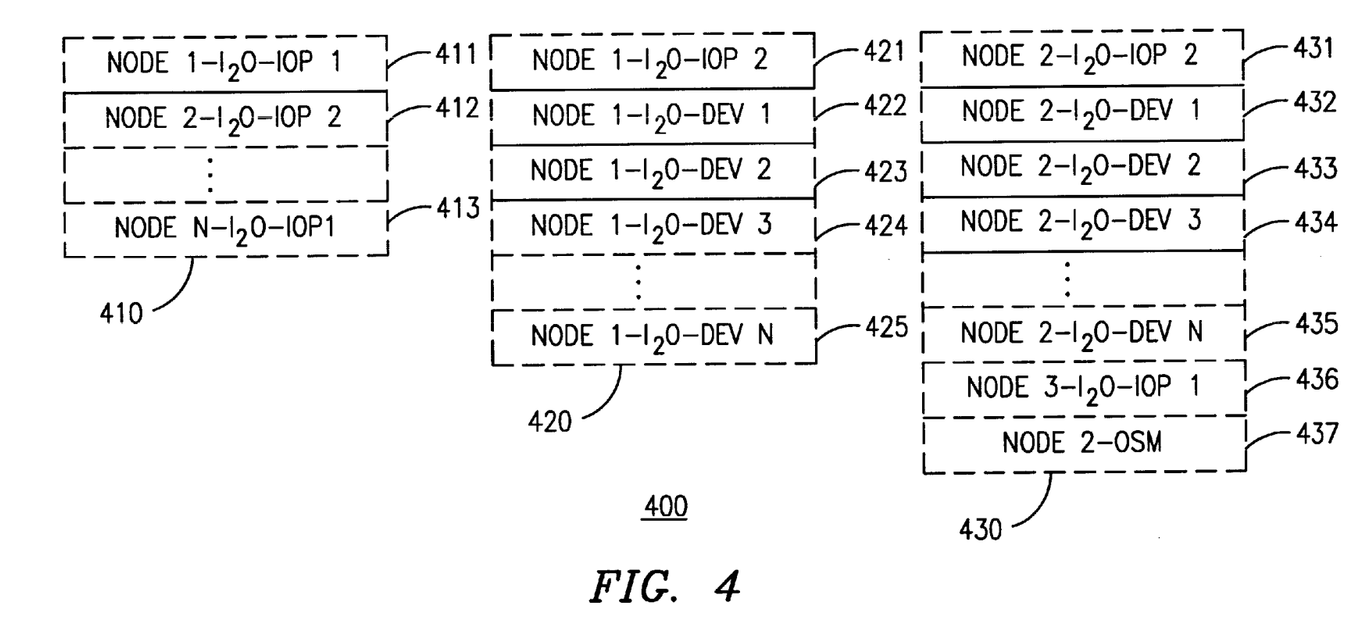
FIG. 4 is a diagram illustrating exemplary multicast message blocks in accordance with the teachings of the present invention, containing status request messages for each exemplary device and IOP in the SAN.

FIG. 4 illustrates the manner in which the point-to-point status request messages of FIG. 2 are broken into a distributed series of status request messages for multicast distribution. Message block 410 represents status report messages that must be generated for all nodes in SAN 300. While SAN 300 is shown as an exemplary two-node SAN, it should be understood that more nodes are possible such that for each node in a SAN a status request message will be generated and issued to governor IOPs for each node, by a performance monitoring OSM in the case of the governor IOP local to the performance monitoring OSM or an adjacent governor IOP in the case of all other nodes.

When governor IOP-1 320 receives the status request message 411 from performance monitoring OSM 310, a series of messages as shown in message block 420 are generated for each IOP and device within node 1. Since node 1 is shown with three exemplary devices and an exemplary additional IOP, a total of 4 status request messages will be generated. Status request messages 421 through 425 illustrate the status request messages generated by governor IOP-1 320 for node 1. For node 2, IOP-1 360 generates message block 430 containing status request messages 431 through 436 for each device and IOP in node 2. Also, for adjacent nodes, a status request message is propagated from node 2 to the governor IOP associated with an adjacent node if present. Accordingly, status request messages for performance monitoring may be propagated through an entire SAN fabric in a manner which decreases traffic, and thus latency, at the performance monitoring node by establishing a staggered sequence of message distribution using multicast message distribution in accordance with the teachings of the present invention. Furthermore, responses for such multicast messages from devices can be issued in a correspondingly staggered manner.

Figure 5:
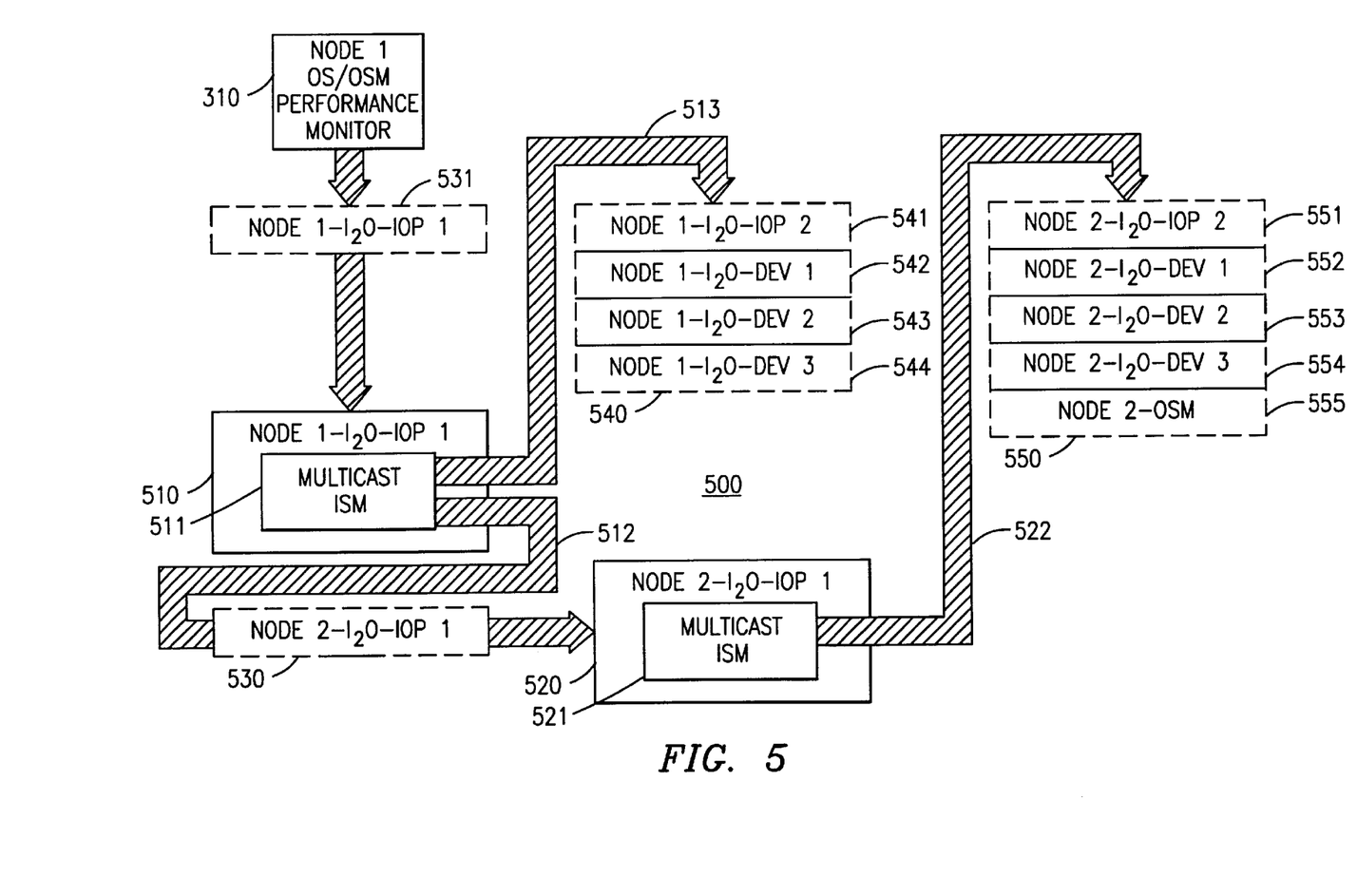
FIG. 5 is a diagram illustrating the issuance of an exemplary two node multicast performance monitoring status report in accordance with the teachings of the present invention.

FIG. 5 illustrates the issuance of a status request message by node 1 performance monitor OSM 310 to begin the sequence of events occurring during an exemplary performance monitoring cycle. Status request message 531 is issued by node 1 performance monitor OSM 310 to node 1 governor IOP-1 510. Multicast ISM 511 processes the status request message 531 and may be configured to generate the appropriate requests to adjacent nodes and to devices within the node by constructing and issuing message blocks via well known software messaging mechanisms according to, for example, device addresses. In it response to status request message 531, status request message 530 may be issued by multicast ISM 511 to adjacent node 2 IOP-1 520 across SAN interconnect fabric 512 in order to propagate the status request message to node 2 and associated devices. In addition, message block 540 may be generated and issued across an appropriate network portion 513 to IOP's and devices within node 1. For example, referring again to FIG. 3, node 1 IOP-2 330 may receive status request message 541, node 1 DEV-1 312 may receive status request message 542, node 1 DEV-2 321 may receive status request message 543 and node 1 DEV-3 331 may receive status request message 544. While node 1 is shown to contain an exemplary 3 devices and one additional IOP it is possible that more or fewer devices and IOP's may be present at node 1.

After processing status request message 530, adjacent node 2 governor IOP-1 520 may generate status request message block 550 using multicast ISM 521. Message block 550 may be communicated across a suitable network portion 522 to devices within node 2. For example, node 2 IOP-2 370 receives status request message 551, node 2 DEV-1 352 receives status request message 552, node 2 DEV-2 361 receives status request message 553, node 2 DEV-3 371 receives status request message 554. In addition, node 2 OSM 350 may receive status request message 555 for node management purposes. Accordingly, it should be appreciated that multicast ISM's associated with governor IOP's operate as message passing intermediary structures in accordance with the teachings of the present invention.

Status request messages 541–544 and 551–555 are generated in the exemplary two node SAN, by respective governor IOPs 510 and 520, and may then be distributed across the SAN fabric. For example, shown in FIG. 5 is a portion of SAN fabric 512. It is to be noted that, in various embodiments of the present invention when referring to the SAN fabric, it should be understood by those skilled in the art that any switching interconnect over which a message can be passed or data can be transferred considered part of the SAN fabric. This may include but is not limited to, for example, system buses, device buses, network adapters, network interface control and the like. Status request messages may be distributed within each node across, exemplary PCI bus 311 and 351; through exemplary address translation units 340 and 380; and across related internal buses, for example, internal buses 322 and 362 which are shown in FIG. 3. As status request messages are generated and distributed to devices through the multicast messaging system of the present invention, responses may be propagated back to node 1 OSM performance monitor 310 in one of two modes; healthy and unhealthy.

Figure 6:
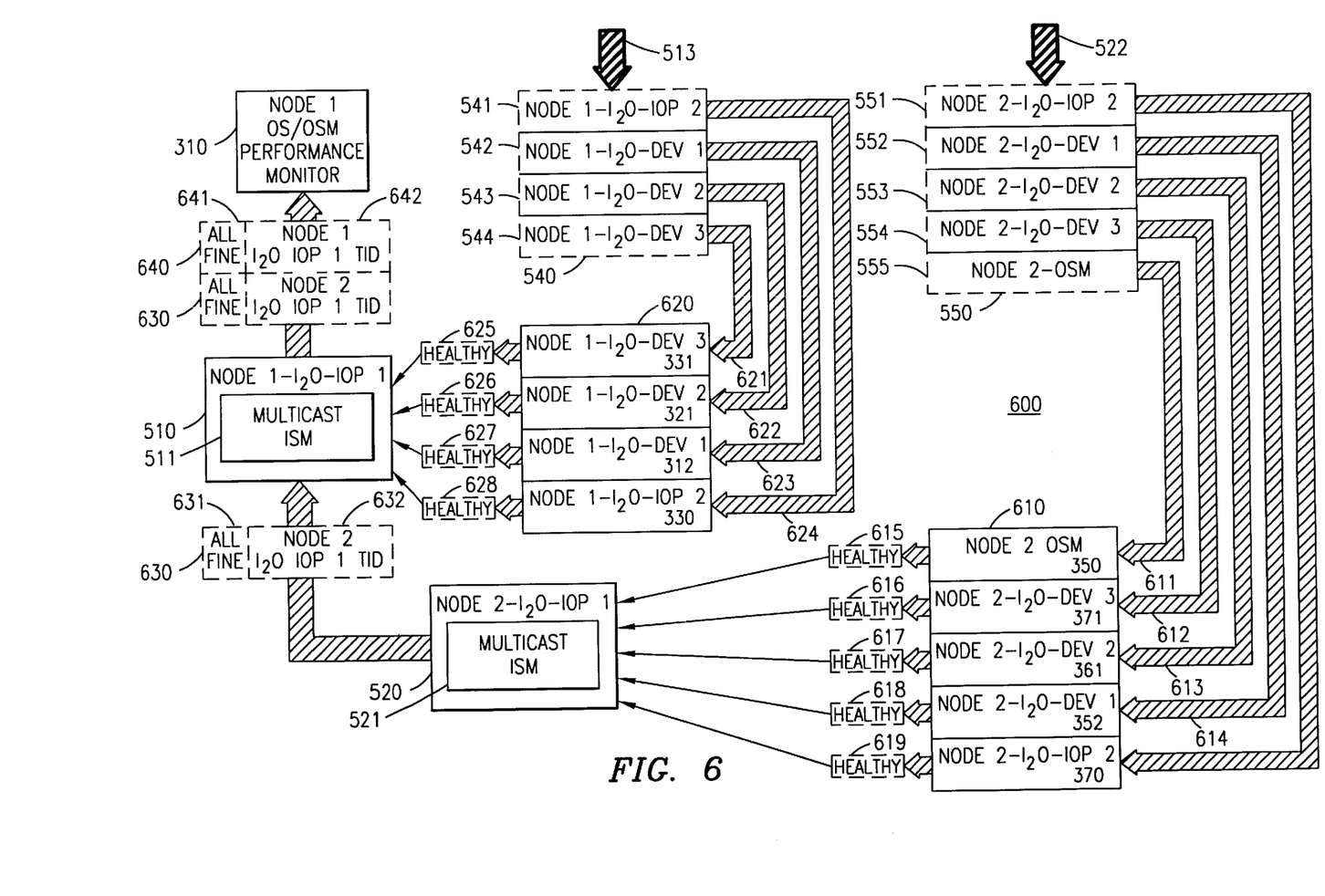
FIG. 6 is a diagram illustrating the response to the performance monitoring status report shown in FIG. 5 in a healthy SAN.

FIG. 6 illustrates the distribution of status request message blocks 540 and 550 to individual devices and the generation of responses thereto by governor IOPs 520 and 510. Node 1 status request messages 541 through 544 are distributed to node 1 DEV-1 312, node 1 DEV-2 321, node 1 DEV-3 331, and node 1 IOP-2 330 through paths 621 through 624 of network portion 513. As 15 devices 620 of node 1 are determined to be healthy, each device may issue an indication of "healthy" as in exemplary indication 625 issued by node 1 DEV-3 331 to governor IOP-1 510 for node 1. As healthy indications 625 through 628 are received, multicast ISM 511 may issue an "all fine" indication to node 1 performance monitoring OSM 310 by issuing response message 640. The response message 640 preferably comprises at least an "all fine" field 641 and ID field 642 wherein the source ID is set to the target ID (TID) for the governor IOP-1 510 of node 1. Such a response indicates to node 1 performance monitoring OSM 310 that all devices controlled by multicast ISM 511 are healthy. Further, in order for multicast ISM 551 to issue an "all fine" indication, however, "all fine" indications must first be received from all nodes. For example, status requests messages 551 through 555 maybe received by devices 610 of node 2, across paths 611 through 614 of network portion 522. Since, in the illustrated example, all devices are healthy, healthy responses 615 through 619 are issued to node 2 governor IOP-1 520. Multicast ISM 521 associated with node 2 governor IOP-1 520 may then issue an "all fine" indication to node 1 IOP-1 510 across SAN network portion 512. Response message 630 may preferably contain "all fine" indication field 631 and TID field 632 of node 2 IOP-1 . Upon receiving the all fine 630 indication from node 2, node 1 governor IOP-1 510 may process response message 640 to node 1 performance monitor OSM 310 indicating that all devices are healthy as previously described. If all devices are not healthy, response message 640 may contain the TID of the unhealthy device so that point-to-point transactions may be carried out. If more than one device is unhealthy, multiple response messages 640 may be propagated to performance monitoring OSM 310. Point-to-point message transactions may be established between performance monitoring OSM 310 and each ailing device based on the received TID 642 for each ailing device.

Figure 7:
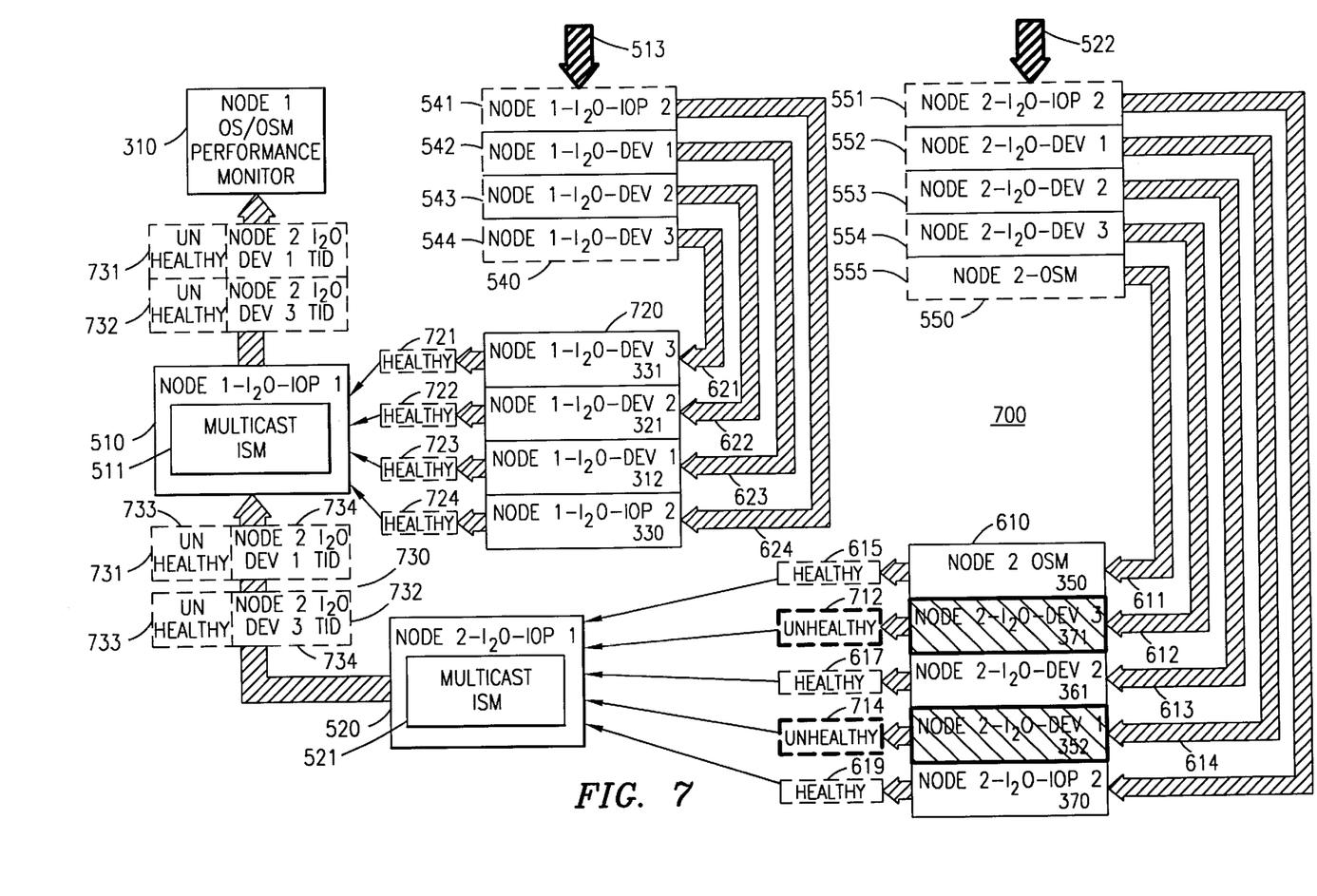
FIG. 7 is a diagram illustrating the response to the performance monitoring status report shown in FIG. 5 in an unhealthy SAN.

FIG. 7 illustrates an exemplary case where node 2 DEV-1 352 and node 2 DEV-3 371 are unhealthy. As message block 555 is received at devices 610 across paths 611 through 614 via network portion 522, healthy indications 615, 617, and 619 are issued to node 2 governor IOP-1 520 for node 2 OSM 350, node 2 DEV-2 361, and node 2 IOP-2 370, respectively. For node 2 DEV-1 352 and node 2 DEV-3 371, unhealthy responses 714 and 712, respectively, are issued to node 2 governor JOP-1 520. Multicast ISM 521 processes the responses from devices 610 by generating response messages 731 and 732 to node 1 governor IOP-1 510. In response message 731 and 732, unhealthy indication field 733 along with TID field 734 of ailing devices node 2 DEV-1 352 and node 2 DEV-3 371 are included. As shown in FIG. 7, unhealthy status responses for each ailing device may be issued separately by multicast ISM 521 to node 1 governor IOP-1 510. In response to the unhealthy status response messages 731, 732 multicast ISM 511 for node 1 governor lOP-1 510 propagates the unhealthy status response messages 731, 732 to node 1 OSM performance monitor 310. Once responses to multicast status request messages are processed and propagated to performance monitor OSM 310, point-to-point communications may be established between node 1 performance monitoring OSM 310 and ailing devices only. Accordingly, point-to-point transactions related to performance monitoring are minimized advantageously in accordance with the teachings of the present invention.

Figure 8:
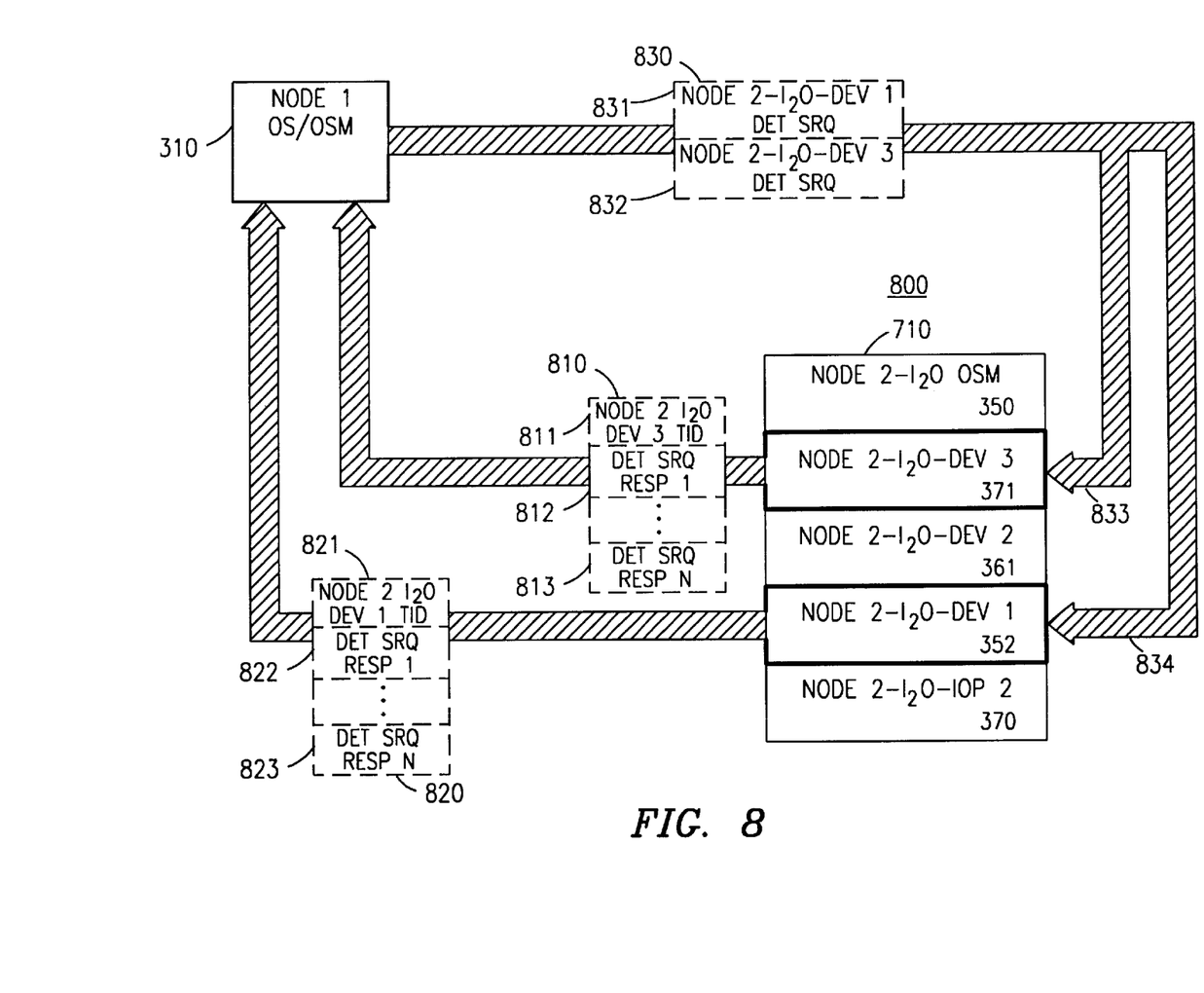
FIG. 8 is a diagram illustrating an exemplary point-to-point performance monitoring detailed status report and responses for unhealthy devices as shown in FIG. 7.

FIG. 8 illustrates a subsequent request for detailed status information made by node 1 performance monitor 310 in response to the receipt of unhealthy status responses 731 and 732 shown in FIG. 7. Node 1 performance monitoring OSM 310 may issue point-to-point detailed status request (SRQ) messages 831 and 832 to each of the ailing devices node 2 DEV-1 352 and node 2 DEV-3 371 respectively. Detailed status request message 831 and 832 may be communicated to node 2 DEV-1 352 and node 2 DEV-3 371 across paths 834 and 833 respectively. Upon receiving detailed status request messages 831 and 832 node 2 DEV-1 352 and node 2 DEV-3 371 may issue detailed response messages 820 and 810, respectively, preferably directly to performance monitoring OSM 310. Message 820 and 810 may contain additional fields indicating the TID of the device, for example node 2 DEV-1 TID 821 and node 2 DEV-3 TID 811. In addition, detailed response information may be included in additional messages, for example, detailed status request response message 1 812 for node 2 DEV-3 and detailed status request response message 1 822 for node 2 DEV-1.

Additional information may be sent in up to N additional messages for example, detailed status request response message N 813 for node 2 DEV-3 and detailed status request response message N 823 for node 2 DEV-1.

Based upon the foregoing, it should be appreciated that, using the multicast system of the present invention, traffic volume associated with performance monitoring may be minimized. Accordingly, the minimized traffic volume preserves the low latency inherent and advantageously provided in SAN architectures.

Although the preferred embodiments of the apparatus and method of the present invention have been illustrated in the accompanying Drawings and described in the foregoing Detailed Description, it is understood that the invention is not limited to the embodiments disclosed, but is capable of numerous rearrangements, modifications and substitutions without departing from the spirit of the invention as set forth and defined by the following claims.

What is claimed is:

1. A system comprising:
    a first message passing intermediary in a network, the first message passing intermediary forming at least a part of a first network node, the first message passing intermediary configured to:
        receive a status request message from a performance monitoring server; and
        propagate the status request message across the network to minimize concurrently issued point-to-point status requests messages.

2. The system as recited in claim 1, further comprising:
    a second network node connected to the first network node by an interconnect fabric;
    wherein the first network node includes a first plurality of devices and the second network node includes a second plurality of devices and a second message passing intermediary.

3. The system as recited in claim 2, wherein the first message passing intermediary is further configured to propagate the status request message to the first plurality of devices and to the second message passing intermediary.

4. The system as recited in claim 3, wherein the second message passing intermediary is further configured to:
    receive a status request message propagated from the first message passing intermediary; and
    propagate the status request message to the second plurality of devices.

5. The system as recited in claim 4, wherein the second message passing intermediary is further configured to propagate the status request message to a third network node.

6. The system as recited in claim 2, further comprising:
    an Operating System Module (OSM) residing on the performance monitoring server, the OSM configured to generate the status request message and issue the status message to at least one of the first and second message passing intermediaries,
    wherein the first message passing intermediary resides on a first IOP and the second message passing intermediary resides on a second IOP.

7. The system as recited in claim 2, wherein the first message passing intermediary is a first multicast Intermediate Service Module (ISM), and the second message passing intermediary is a second multicast ISM, the first multicast ISM further configured to propagate the status request message across the network in a multicast mode, the second multicast ISM further configured to receive the status request message from the first multicast ISM and to propagate the status request message across the network fabric in a multicast mode.

8. The system, as recited in claim 4, wherein each of the first and second plurality of devices includes at least one IOP, and further wherein one of the at least one IOP is designated as a governor IOP such that the first message passing intermediary resides in the first governor IOP and in second message passing intermediary resides in the second governor IOP.

9. The system as recited in claim 8, wherein the each governor IOP is further configured to receive a plurality of responses from each of the respective first and second plurality of devices and to generate a response indicating the health of the respective first and second plurality of devices.

10. The system as recited in claim 8, wherein the first governor IOP is further configured to:
    receive a status response message from the first plurality of devices; and
    receive a status response message from the second governor IOP indicating the status of the second plurality of devices.

11. The system as recited in claim 10, wherein the status response is a two-mode status response including a "healthy" mode and an "unhealthy" mode, and wherein the first governor IOP is further configured to report the Target ID (TID) of the governor IOP associated with the first node for the status response in the healthy mode and to report the TID of an unhealthy device for the status response in the unhealthy mode to the performance monitoring server.

12. The system as recited in claim 11, wherein the performance monitoring server, upon receipt of the "unhealthy" mode status response, is configured to issue a point-to-point detailed status request to the "unhealthy" device.

13. A system, comprising:
    a first message passing intermediary structure forming at least part of a first network node disposed in a network; and
    a second message passing intermediary structure forming at least a part of a second network node disposed in the network, wherein each of the first and second message passing intermediary structures is configured to:
        receive a status request message from a performance monitoring apparatus; and
        process the status request message and in response thereto propagate the status request message across the network to the other message passing intermediary structure.

14. A method for monitoring performance in a network comprising the steps of:
    sending a status request message to a governor I/O processor (IOP) disposed at a first node; and
    propagating the status request message across the network to minimize concurrently issued point-to-point status requests messages.

15. The method as recited in claim 14, further comprising the steps of:
    interconnecting the first node with a second node using a network interconnect fabric;

wherein the first node includes a first message passing intermediary and a first plurality of devices and the second node includes a second plurality of devices and a second message passing intermediary.

16. The method as recited in claim 15, further comprising the step of propagating the status request message from the first message passing intermediary to the first plurality of devices and to the second message passing intermediary.

17. The method as recited in claim 15, further comprising the steps of:

receiving a status request message at the second message passing intermediary propagated from the first message passing intermediary; and propagating the status request message to the second plurality of devices.

18. The method as recited in claim 17, further comprising the step of propagating the status request message from the second message passing intermediary to a third adjacent network node.

* * * * *